Dec. 24, 1935.　　　A. HIRSCHFIELD　　　2,025,451
APPARATUS FOR MANUFACTURING LAMINATED TENNIS AND LIKE RACKET FRAMES
Original Filed March 16, 1933　　5 Sheets-Sheet 1
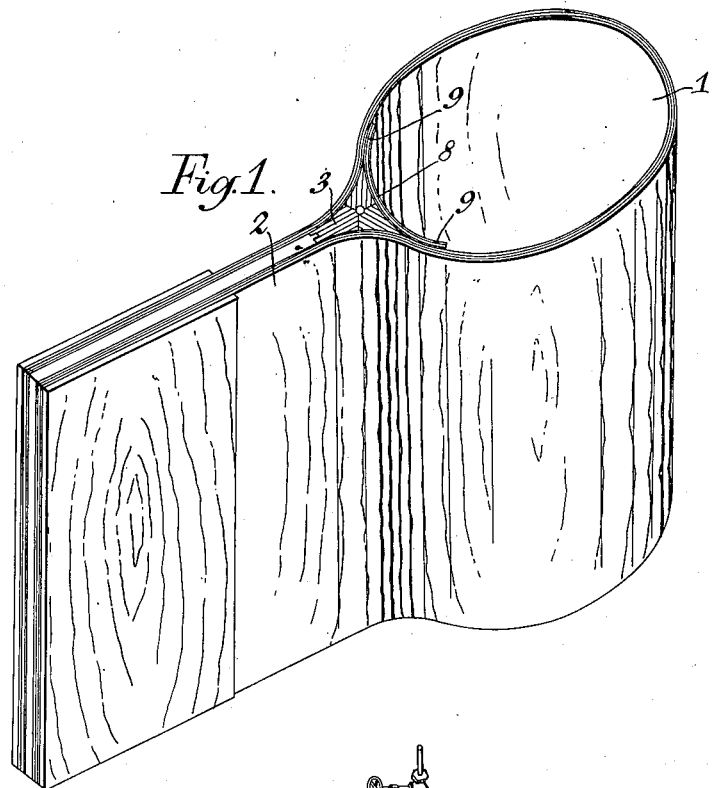
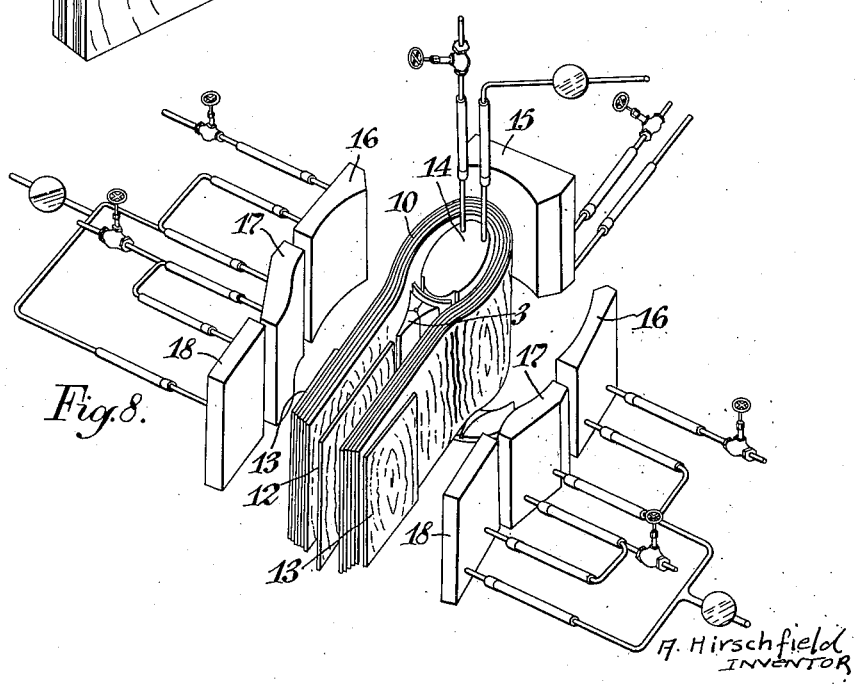

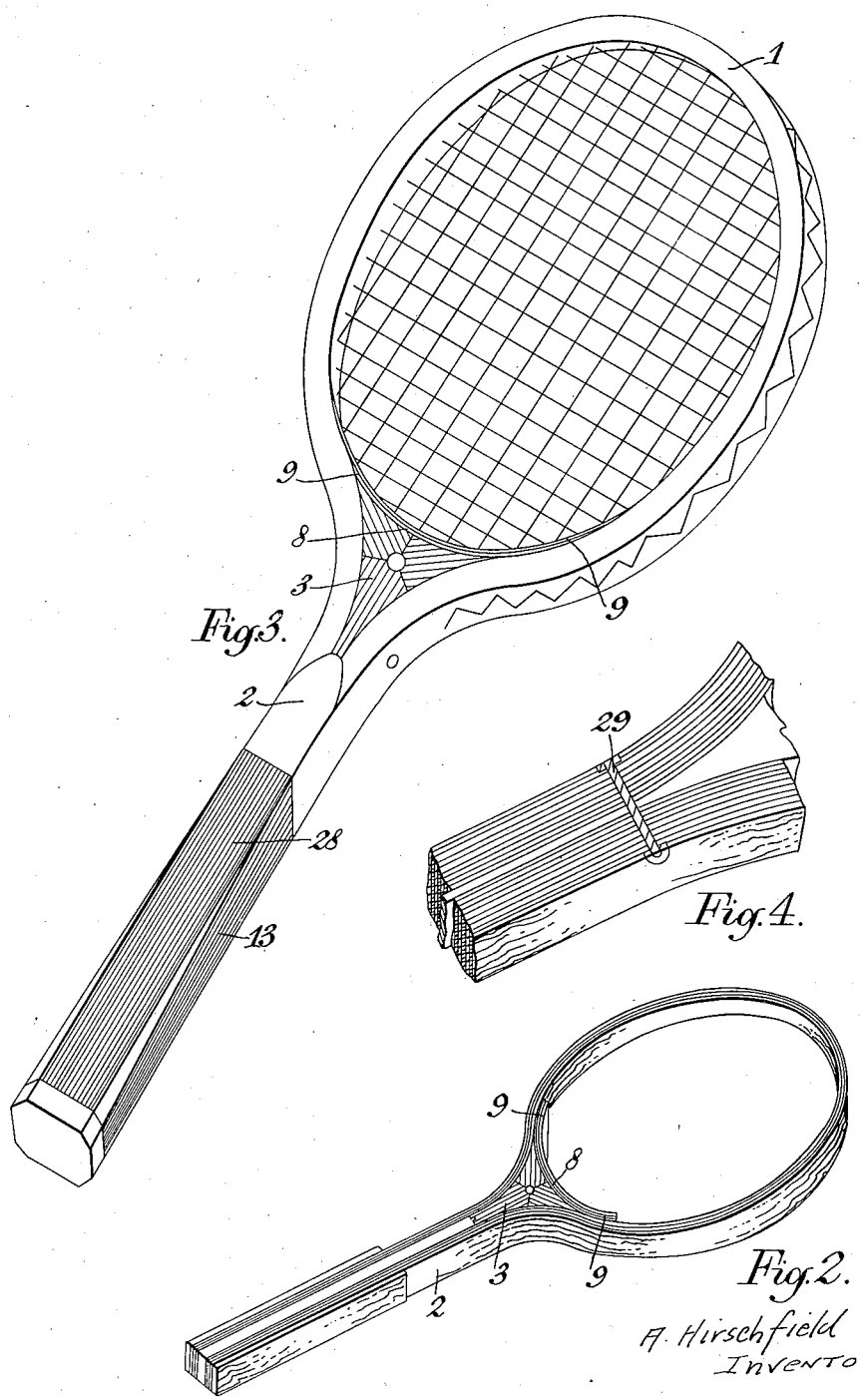

Dec. 24, 1935. A. HIRSCHFIELD 2,025,451
APPARATUS FOR MANUFACTURING LAMINATED TENNIS AND LIKE RACKET FRAMES
Original Filed March 16, 1933    5 Sheets-Sheet 3

A. Hirschfield
INVENTOR

By Marks & Clark
Attys.

Dec. 24, 1935.   A. HIRSCHFIELD   2,025,451
APPARATUS FOR MANUFACTURING LAMINATED TENNIS AND LIKE RACKET FRAMES
Original Filed March 16, 1933   5 Sheets-Sheet 4
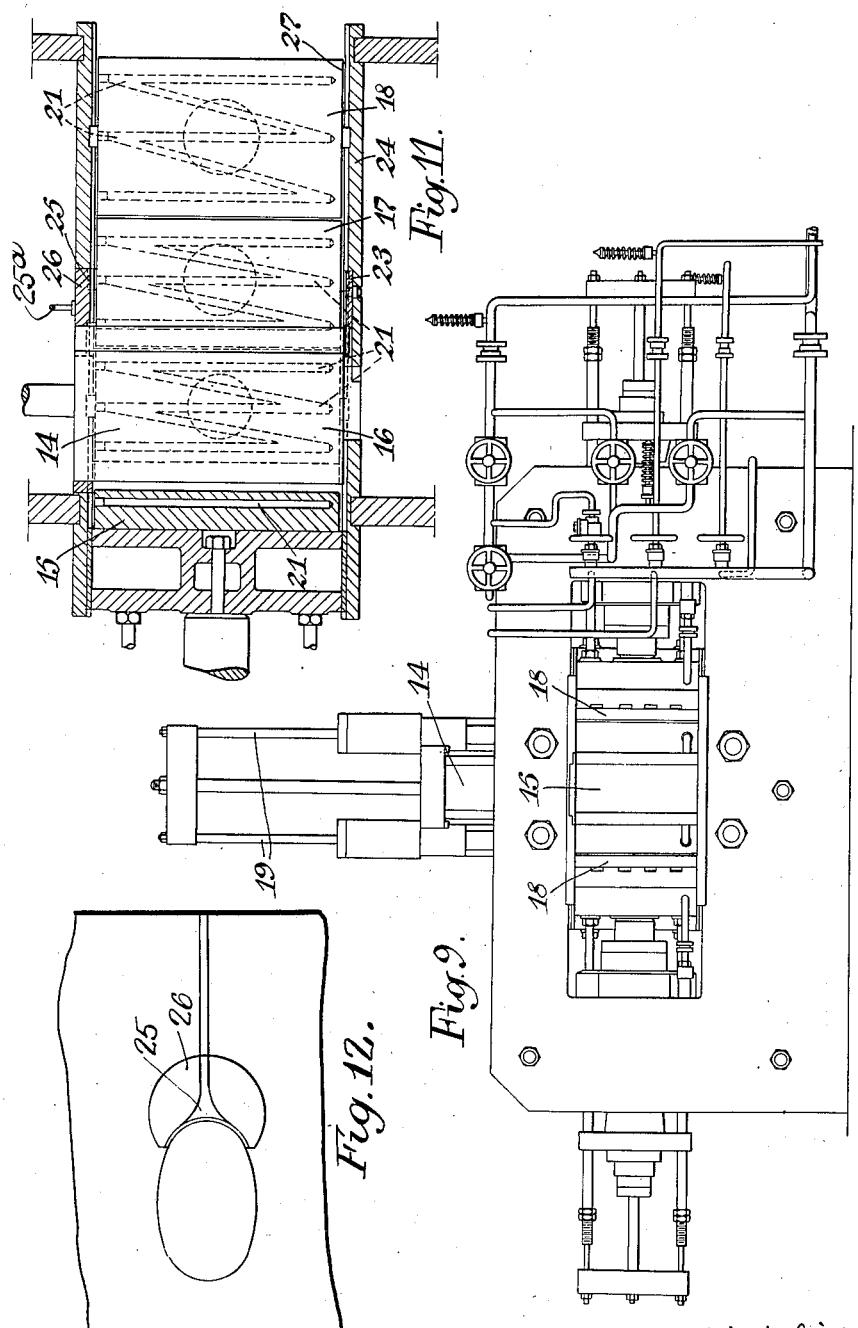

Dec. 24, 1935.   A. HIRSCHFIELD   2,025,451
APPARATUS FOR MANUFACTURING LAMINATED TENNIS AND LIKE RACKET FRAMES
Original Filed March 16, 1933   5 Sheets-Sheet 5
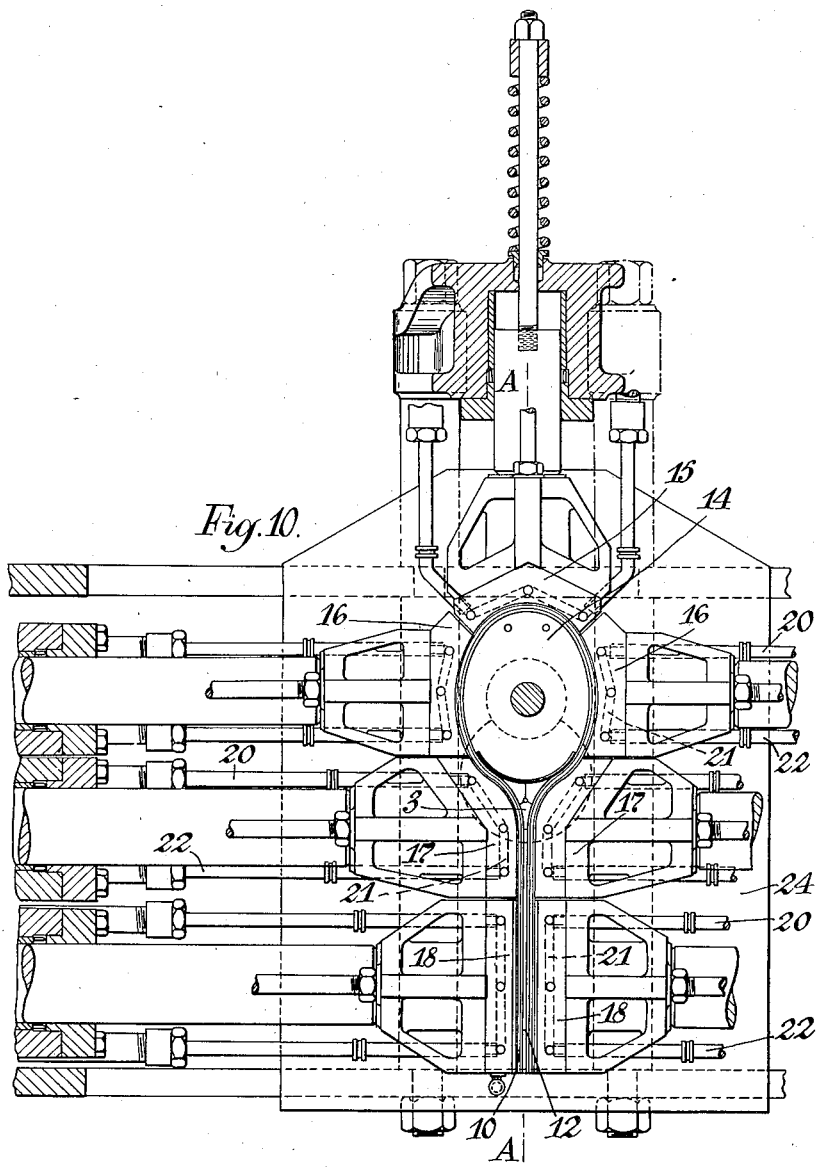

Patented Dec. 24, 1935

2,025,451

UNITED STATES PATENT OFFICE 2,025,451

APPARATUS FOR MANUFACTURING LAMINATED TENNIS AND LIKE RACKET FRAMES

Alexander Hirschfield, London, England

Original application March 16, 1933, Serial No. 661,166. Divided and this application January 8, 1934, Serial No. 705,813. In Great Britain March 23, 1932

4 Claims. (Cl. 144—254)

This invention relates to the manufacture of laminated tennis and like racket frames, the present application being a division from my copending application Serial No. 661,166, filed Mar. 16, 1933.

The usual method of making racket frames by bending a solid piece of wood is a slow, costly and difficult process and, on account of atmospheric conditions and influences, the racket frames have tendency to warp and twist so that the rackets are rendered useless after a comparatively short period of use. This usual process of making rackets is also costly on account of the large amount of waste timber involved, even after a selection of prime wood, and involves a large proportion of rejects from the finished articles. The process, involving as it does a bending of each racket frame separately, is also a slow one.

With a view to overcoming the above disadvantages of racket frames made from solid wood some manufacturers have attempted to produce laminated racket frames by gluing together several pieces of wood. In the production of these laminated racket frames, however, wet glue has been relied upon to cause adherence of the plies and this has resulted in the imparting of additional moisture to the plies and the consequential easy tendency for the rackets produced to warp or twist. Further, it is difficult to effect a uniform distribution of a wet glue over the surfaces of the plies, so that the gluing strength of the glue joints is impaired.

The present invention has for its object to provide improved apparatus for producing laminated tennis racket and similar frames as will be hereinafter described, illustrated and claimed.

In the accompanying drawings:—

Figure 1 is a perspective view of a composite structure in accordance with the invention and from which a plurality of racket frames may be formed.

Figure 2 is a perspective view of a tennis racket frame according to the invention;

Figure 3 is a perspective view of a completed tennis racket, made in accordance with the invention;

Figure 4 is a fragmentary view of a detail;

Figure 8 is a diagrammatic perspective view of a press for completing a composite structure of the form seen, for example, in Figure 1.

Figures 9, 10 and 11 are views of an actual press provided for this purpose, Figure 9 being a front elevation, Figure 10 a fragmentary plan, and Figure 11 a cross section on the line A—A of Figure 10 and Figure 12 is an inverted plan view of the top of Figure 11.

In carrying the invention into effect in one convenient manner as applied, for example, to the production of tennis or like racket frames, the latter are formed from a composite structure which, itself, is composed of a plurality of thoroughly dried plies of a suitable wood united together by an adhesive. This composite structure is shaped so as to provide the conventional ring 1 of a racket frame and the handle 2 thereof, while a wedge 3 is also provided at the throat of the said ring. A composite structure, as seen in Figure 1, serves for the production of a number of racket frames (of which one is seen in Figure 2) by slicing the structure longitudinally.

All the parts of the structure are caused to adhere to each other in the required relationship by the use of an adhesive which normally is in a dry condition and is known as a dry film glue, being in fact a synthetic glue. This glue, being obtainable in sheet form, is admirably suited to the carrying out of the invention, sheets of this glue being interposed between the adjacent plies and heat and pressure being applied to effect a fusing of the glue sheets and a firm adherence of the plies without the addition of any moisture thereto after the definite position of the interposed plies has been reached by pressure.

Figure 5:
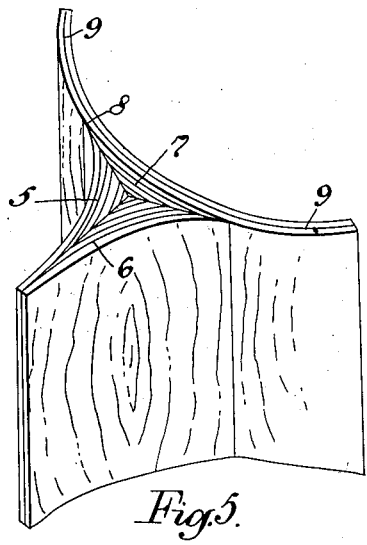

The wedge 3 is separately formed and in general is composed of three segments, each of which may consist of a single piece of wood or be built up from plies of a suitable wood. Thus in Figure 5 a wedge is shown composed of three segments 5, 6, 7, each of which is composed of a plurality of wooden plies arranged so that those of the top section 7 follow generally the shape and grain of that portion of the ring 1 where this part of the wedge is to be located in the completed frame, while the plies of the side sections 5, 6 are arranged generally longitudinally of the handle 2 in the direction of the grain of the latter.

Figure 6:
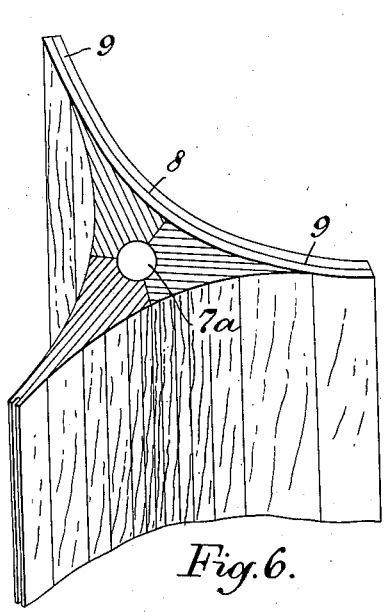
Figures 5, 6 and 7 are perspective views of different wedges provided by the present invention for use in the manufacture of racket frames.
Figure 7:
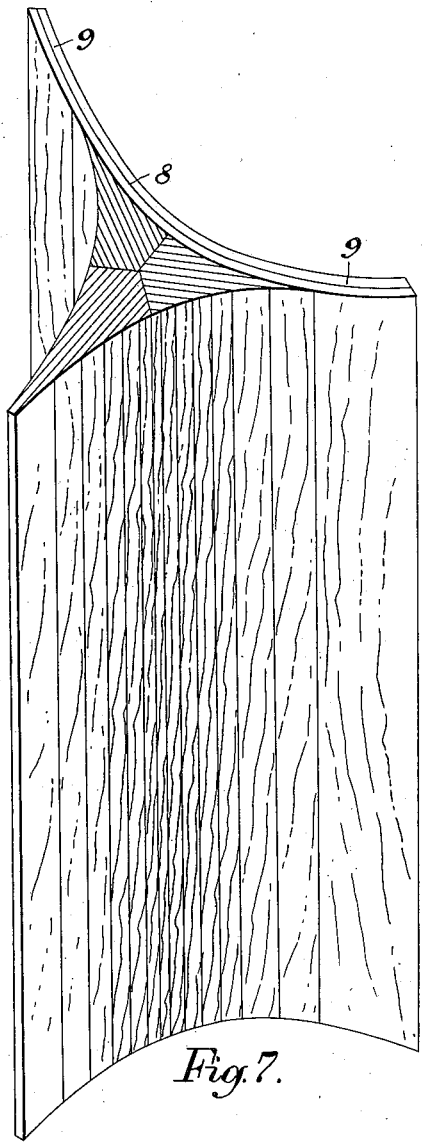

The wedge shown in Figure 6 is composed of three segments united together and to a central rod 7a and these segments are formed from single blocks of wood arranged so that the grains thereof follow generally the shape of the ring or handle parts of the racket frame as in the previously described wedge. In some cases it may be desired to omit the central rod 7a and provide a wedge of the construction shown in Figure 7 which otherwise is similar to the wedge illustrated in Figure 6. A separate piece of wood 8 composed of one or more plies is secured to the top of the wedge, which piece forms a reinforcement at the throat of the racket ring 1, and has portions 9 thereof extended beyond the sides of the wedge and adapted to be secured to the corresponding inner surfaces of the ring part 2, as is clearly seen in Figures 1 and 2. The correct shaping of the side surfaces of the wedge segments may be effected by holding the wooden blanks (from which these segments are formed) in suitable jigs and subjecting the exposed portions of the blanks to the action of appropriately shaped spindle cutters.

The wedge segments, according to one convenient mode, are assembled in a jig, together with pieces of dry film glue disposed so as to lie between the surfaces of the wedge segments to be joined together, and having assembled the wedge parts in this jig a dog is driven into each end of the assembled wedge parts, said dog serving temporarily to hold the wedge parts together in correct relationship and facilitate their insertion into a press where they are permanently secured together by a fusing and setting of the adhesive. The wedge having been assembled in this jig and the dog secured at the ends of the wedge, same is removed from the jig and inserted in the opening in the said press, such that the tapered end of the bottom wedge segment fits into a slot formed in a vertically movable table and the outer walls of the wedge segments lie against the inner side walls of the said table, these latter walls being shaped to conform with the shape of the outer walls of the wedge segments. The reinforcement piece 8 is then placed upon the top and exposed surface of the wedge together with an intervening piece of dry film glue, whereupon the said table is raised (as by the conventional hydraulic ram) so as to bring the reinforcement band into engagement with a fixed part which has a convex under surface conforming with the desired final shape of the said reinforcement band. This movement of the table is carried out to such an extent as will cause the wedge segments and reinforcement band to be pressed together firmly and afford the necessary pressure to cause a firm adherence of these parts by the dry film glue, the heat for this gluing operation being provided by heating the said table surfaces and the convex surface of the said fixed part. A complete wedge unit of a depth corresponding with that of the said composite structure is thus formed ready for transportation bodily to another press in which the formation of the composite structure aforesaid is completed and which will be described later.

The ring and handle parts 1, 2 respectively of the racket frames are, as will be appreciated from consideration of the foregoing, produced from plies of wood which prior to their insertion in the press are, together with sheets of dry film glue disposed between the adjacent plies, bent into a substantially U-formation and held in such form by another jig which grips the free ends of the sheets. The so assembled sheets are thus readily transportable to the said second press which binds the sheets together and is illustrated in Figures 8 to 11. Having placed the assembled plies in this press the said jig may be removed leaving the bent sheets free to be pressed into the required form. This preliminary bending of these sheets is readily accomplishable by laying the sheets of wood and film glue upon a horizontal table having a central opening into which the sheets are moved so that they are formed into a substantially U-formation by means of a vertically reciprocable ram which engages and bears upon the middle portion of the sheets disposed across the opening. Having operated this ram so to deform the sheets the free ends of the sheets (i. e. the ends of the U) which are left projecting upwardly above the said table are clamped together by this second jig.

As previously mentioned the dry film glue employed for carrying out this invention is obtainable in sheet form. Actually this sheet material is supplied in roll form and for the purpose of cutting strips of this material from a roll thereof, which strips shall be of the required dimensions (approximating those of the separate plies of wood), an apparatus may be employed which comprises a table to suit such dimensions and upon which table the strips of adhesive material may be severed from the roll.

Referring now to Figures 8 to 11 and in the first instance to the diagram (Figure 8) this U-shape assembly of plies and sheets of dry film glue (indicated generally by the reference 10) are shown arranged within the said second press together with a wedge unit completed in the above described manner (this wedge being indicated generally by the reference 3) and a central handle piece 12 and outside handle pieces 13, all of which parts are firmly united to each other in the desired relationship by the operation of the press parts. These comprise, essentially, a central former 14, a head platen 15 and pairs of side platens 16, 17 and 18. The said platens, which are adapted to be heated, and also the central former 14, are operated in sequence so that the bending of the assembly 10 takes place progressively from the apex of the U thereof towards the ends thereof thereby allowing for any longitudinal movement of the said assembly under the pressure of these platens and obviating the formation of any "wrinkles" in the finally pressed assembly. Thus the head platen 15 would be operated first followed by the side platens 16, 17 and 18, in the order mentioned, the two platens of each pair moving together. The former 14 is adapted for vertical movement so as to leave the table of this press free to receive the assembly 10. In the specific press illustrated in Figures 9 to 11 the former 14 is adapted to be raised and lowered by the hydraulically actuated ram 19, the platens 15 to 18 being also hydraulically actuated, and this former will be lowered into its position within the assembly of plies 10 prior to the commencement of the sequence of operations of said platens. As previously mentioned the former 14 and each of the platens are heated, this being effected, for example, by steam applied to each platen by a pipe 20 and circulated through a coil 21 within each platen, said pipe communicating with one end of the coil and the other end of the latter communicating with another pipe 22 which serves to lead away the condensate. The former 14 is similarly heated so that all parts of the racket frame structure are subjected to that amount of heat and pressure (which pressure is conveniently hydraulically applied) necessary to cause the glue to bind the parts of the structure together firmly.

The wedge 3 is held in position in the press, prior to its becoming united to the assembly 10, by the bottom end of the wedge being seated within a recess 23 provided in the table 24 and the top end of the wedge being held within a corresponding recess 25 provided on a removable plate 26 so that the wedge may be lowered endwise into this position. The plate 26 which has the wedge-shape recess in its underneath surface is provided, on its top surface, with a handle 25a by which it can be removed from the press to permit of the wedge 3 being placed in position within the press with its bottom end seated within the recess 23 in the table whereupon the plate 26 is placed in position such that the top end of the wedge is seated within the recess 25 in said plate. The table 24 is also provided with a longitudinal recess 27 in which the bottom edge of the central handle piece 12 is adapted to be received and held in position for attachment to the corresponding inner surfaces of the handle forming part of the said assembly 10 by pieces of dry film glue disposed between these surfaces and the surfaces of such piece 12. The press as seen in Figure 11 is adapted for the reception of a wedge unit of the construction seen in Figure 6, but by arranging for the said plate 26 to be removable and by providing the bottom wedge recess 23 in a removable part of the press table 24 also, these wedge accommodating parts may be replaced by others having wedge recesses of different formation so that by a suitable selection as to the contour of the platens 15 to 18 also the press may be adapted for the manufacture of racket frames having different outlines, for example, that of badminton or squash rackets. The outside handle pieces 13 may be arranged in position within the press just prior to the closing of the last pair of platens 18 they being subsequently taken up by these platens and pressed firmly thereby against the corresponding outer surfaces of the handle forming part of the said assembly 10, pieces of dry film glue being also disposed between these surfaces and the inner surfaces of the said pieces 13. When the above sequence of operations of the press has been completed and the necessary amount of heat and pressure applied the former 14 is raised and the platens withdrawn so that the formed structure may be removed from the press, this structure being now of the form seen in Figure 1. The structure is then sliced longitudinally, as previously mentioned, same being centered and guided upon a suitable jig during this slicing operation, whereafter each of the racket frames produced from the structure has another strip of wood 28 (Figure 3), similar to the pieces 13, secured to the top and bottom sides of the handle portion thereof. This adherence of the strips may be effected in another hydraulic press comprising a series of horizontal plates between which the handles of the racket frames may be clamped with the said strips positioned therebetween and which plates may be heated so as to complete the adherence of the strips to the handles by pieces of film glue disposed between the strips and handle surfaces. These side pieces 13 and 28 provided on the racket frame handles enable the latter to be finished to the desired form.

The racket frames are now ready for the conventional finishing operations, including stringing thereof, but instead of employing the conventional screw for maintaining security at the neck of the racket frame I prefer to employ a rivet 29 (Figures 3 and 4) for this purpose.

Having now described my invention, what I claim as new and desire to secure by Letters Patent is:—

1. Apparatus for manufacturing a tennis and like racket frame from a plurality of partially bent wooden veneers united together by an adhesive disposed between them comprising in combination, a table for supporting the laminations, a former corresponding in shape with that of the ring part of the racket frame, means for moving the former away from the table so as to permit of the laminations being placed upon the table in position for them to be bent around the former and to permit of their removal from the table after the bending operation, pressure plates adapted to co-operate with the former so as to finally bend the laminations around the latter, other pressure plates adapted to co-operate with each other so as to form the handle part of the frame, means for moving the said first mentioned pressure plates towards and away from the former, means for moving the said second mentioned pressure plates away from each other and means for heating the laminations as they are bent by the said pressure plates.

2. Apparatus for manufacturing a laminated tennis and like racket frame from a plurality of partially bent wooden veneers comprising in combination, a table for supporting the laminations, a former corresponding in shape with that of the ring part of the frame, means for moving the former vertically so as to enable the laminations to be placed upon and removed from the table, pressure plates having their operative faces adapted in the closed position thereof to correspond in shape with that of the ring part of the frame, means for moving the said pressure plates horizontally so as finally to bend a portion of the laminations around and into close contact with the former, a second series of pressure plates adapted to operate upon the remaining portion of the laminations so as to form the handle part of the frame, means for moving these second series of pressure plates into engagement with the remaining portion of the laminations so as to press the laminations of such portion into close contact with each other, and means for heating the laminations during the bending and pressure operation.

3. Apparatus according to claim 1 wherein the table is formed with an elongated recess which is adapted to receive the bottom edge of a ply for attachment to the centre of the handle of the racket frame.

4. Apparatus according to claim 1 wherein the table is formed with a recess adapted to receive one end of a wedge for attachment to the throat part of the frame and wherein a removable plate member is provided having a recess therein adapted to receive the other end of said wedge.

ALEXANDER HIRSCHFIELD.